Dec. 25, 1928.  
V. Z. CARACRISTI  
1,696,470  
OPERATING MEANS FOR SPEED INDICATORS OR RECORDERS FOR LOCOMOTIVES  
Filed June 11, 1924
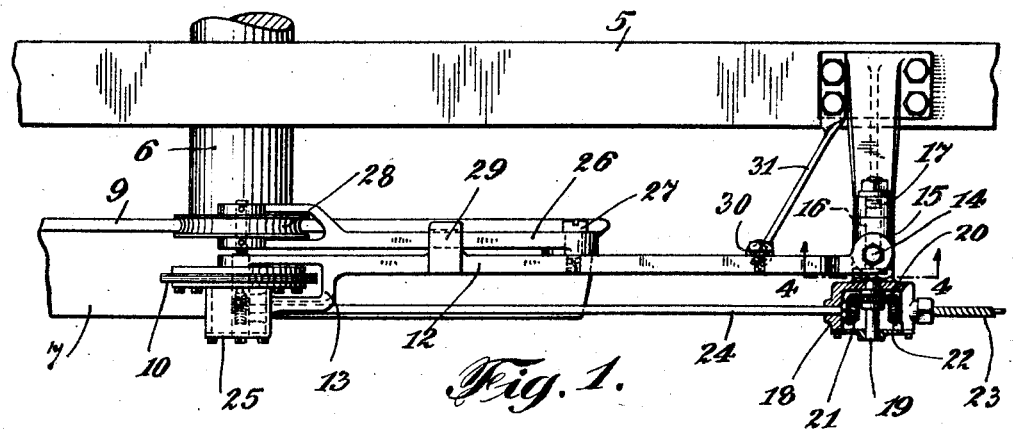
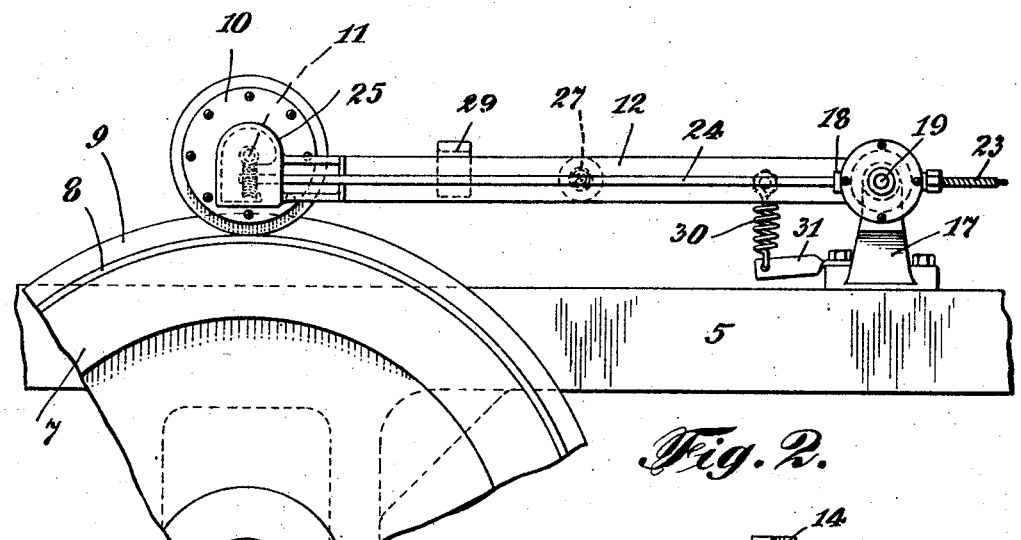
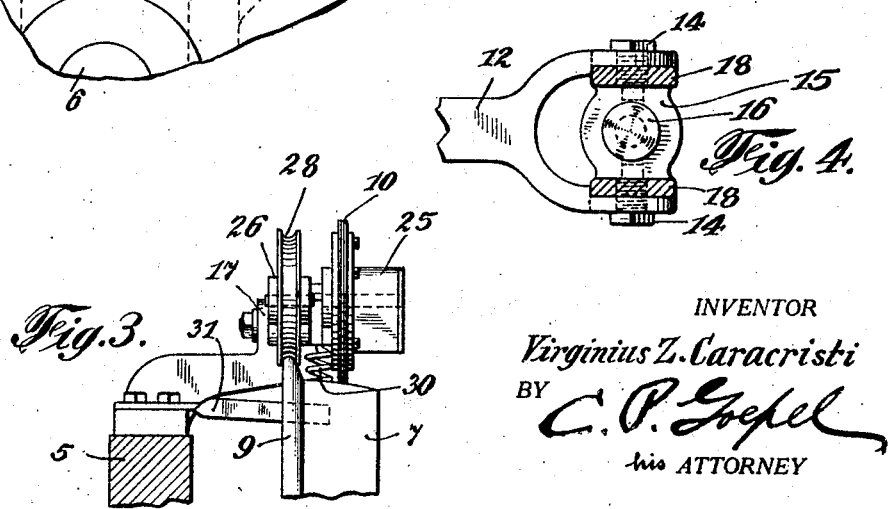
INVENTOR  
*Virginius Z. Caracristi*  
BY  
*his* ATTORNEY Patented Dec. 25, 1928.

1,696,470

UNITED STATES PATENT OFFICE.

VIRGINIUS Z. CARACRISTI, OF BRONXVILLE, NEW YORK.

OPERATING MEANS FOR SPEED INDICATORS OR RECORDERS FOR LOCOMOTIVES.

Application filed June 11, 1924. Serial No. 719,315.

This invention relates to an improved operating means for speed indicators or recorders for locomotives and has for its object to provide a simple, durable and efficiently operating mechanism co-operatively associated with one of the traction wheels of the locomotive for transmitting movement to a speedometer or other speed indicating or recording instrument to thereby indicate or record the speed of the locomotive during definite increments of time or fractional parts thereof.

More particularly, it is an object of the invention to provide improved means for maintaining a revolution transmitting friction wheel in definite position upon the tire tread face of the traction wheel, regardless of relative transverse shifting between the truck wheel and the truck frame.

In one embodiment of the invention, I provide a longitudinally extending support in one end of which the friction wheel is mounted for engagement upon the tread face of the traction wheel. The friction wheel is connected by means of suitable gearing and shafting with the speed indicating or recording instrument in the locomotive cab. In one embodiment, upon a universally pivoted support an arm is pivoted at one of its ends and has a peripherally grooved wheel journaled in its other end and engaged with the traction wheel flange whereby the friction wheel is held against an independent shifting movement upon the tread face of the traction wheel axially thereof so that said friction wheel is at all times engaged with the same circumferential portion of said tread face. In this manner, it will be evident that the revolutions of the traction wheel will be accurately transmitted to the indicating or recording instrument in terms of speed measurement.

With the above and other objects in view, the invention consists in the improved operating means for locomotive speed indicators or recorders and in the form, construction and relative arrangement of the several parts as will be hereinafter more fully described, illustrated in the accompanying drawings and subsequently incorporated in the subjoined claims.

In the drawing wherein I have illustrated one simple, practical and satisfactory embodiment of the invention and in which similar reference characters designate corresponding parts throughout the several views:

Figure 1 is a top plan view partly in section, illustrating one embodiment of the present improvements;

Figure 2 is a side elevation thereof;

Figure 3 is an end view; and

Figure 4 is a detail section taken on the line 4—4 of Figure 1.

In the accompanying drawing, I have illustrated only so much of the locomotive frame structure and of the operating connections between my device and the speed indicating or recording instrument as will enable the essential and novel features of the present improvements to be readily understood. Accordingly, there is shown one of the side frames 5 in which the traction wheel axle 6 is suitably mounted. The traction wheel indicated at 7 may be of any approved construction and is provided with the usual tire tread 8 having the annular flange 9 at one side thereof. It is customary to provide the tread face of the tire with a crowned or convex surface, and since therefore this surface varies in diameter, it will be apparent that certain slight differences in peripheral speed of revolution of said tread face occurs when the truck wheel shifts in the direction of its axis upon the rail, such change in position of the point of contact of the tread surface with the rail occurring intermittently and especially upon curves. Therefore, in order to accurately transmit the revolutions of the traction wheel in terms of speed measurement to an indicator or recorder, it is essential that the primary motion transmitting wheel or element shall at all times be maintained in engagement with the circumferential section of said tread surface normally in contact with the rail. To this end, I provide the motion transmitting disc or wheel 10 having frictional engagement on the tire tread face of the traction wheel at the upper side thereof. This friction wheel is fixed upon a shaft 11 journaled in the bifurcated or forked arm 13 of a longitudinally disposed supporting bar 12. The other end of this bar is also forked or bifurcated and connected by the vertical pivot 14 with a member 15 which is loosely mounted upon the horizontal shaft 16 fixed in the upper end of a bracket 17 secured upon the side frame 5 of the truck. Upon this end of the bar 12 the gear housing 18 is fixed or may be integrally formed therewith. A shaft 19 is mounted in this housing upon which the beveled gear 20 is loosely engaged, said gear meshing at diametrically opposite points with the gears 21 and 22, respectively. Through the medium of the gear 22, the flexible shaft indicated at 23 which extends to the indicating or recording mechanism (not shown) is driven. The other gear 21 is fixed upon one end of a shaft 24 extending in parallel relation to the bar 12, the other end of said shaft extending into a housing 25 on the end 13 of said bar and being suitably geared with the shaft 11 of the wheel 10, as shown in Figure 2 of the drawing.

Upon one side of the bar 12, an arm 26 is pivoted at one of its ends as at 27, and has its other end forked or bifurcated to receive the peripherally grooved wheel 28 which is engaged upon the flange 9 of the traction wheel. The upward swinging movement of arm 26 and the disengagement of wheel 28 from said flange is prevented by a lug 29 formed on the bar 12 which overlies the arm 26.

The wheel 28 and the friction wheel 10 are yieldingly held in proper engagement with the traction wheel by a suitable spring 30 which is connected at its upper end to the bar 12 and at its lower end to a fixed arm 31.

From the foregoing description the manner of operation of the device will be clearly understood. Thus as the traction wheel 7 revolves, rotation is transmitted through the friction wheel 10 engaged upon the tread surface of the wheel, the shaft 24 and gear connections and the flexible shaft 23 to the speed indicating or recording instrument, the ratios of the gears and of wheel 10 with respect to the traction wheel 7 being such that the instrument will be operated to accurately indicate or record the revolutions of the traction wheel in unit terms of speed measurement. In the vertical movements of the frame 5, the bar 12 with the arm 26 and the shaft 24 move as a unit therewith, the member 15 to which the bar 12 is pivotally connected, turning freely on the shaft 16. In the axial shifting movement of the traction wheel upon the rail towards and from the side of the traction frame, the bar 12 will pivot or turn about the vertical pivot 14 of the member 15. Thus the desired flexibility is secured with the assurance that the friction wheel 10 will maintain a constant position upon the tread face of the traction wheel 7 between the inner side of the wheel and the flange 9 thereof so that the number of revolutions of the wheel 10 in each revolution of the traction wheel will be precisely proportionate to the mean diameter of the curved tread face of the traction wheel. In this manner a very high degree of accuracy may be obtained in the operation of locomotive speed indicating or recording instruments.

I have herein shown and described the mounting and arrangement of the several parts of the device with respect to the truck frame, which is simple and practical for the desired purpose. Nevertheless, it is possible that the essential elements of the device might be otherwise mounted to function in the required manner. Therefore, since the several parts in their form, combination and arrangement might be incorporated in various other alternative structures, it is to be understood that I reserve the privilege of resorting to all such legitimate changes as may be fairly considered within the spirit and scope of the invention as claimed.

I claim:

1. Operating means for locomotive speed indicators including a revolution transmitting wheel frictionally engaged with the tread face of a traction wheel, a longitudinally extending support in which said friction wheel is mounted, means sustaining said support at one of its ends for movement about vertical and horizontal axes, means for preventing shifting movement of said friction wheel upon the tread face axially thereof, and means for transmitting rotation of said friction wheel to a speed indicating instrument.

2. Operating means for locomotive speed indicators including a friction wheel engaged with the tread face of a traction wheel, a longitudinally extending bar in one end of which said friction wheel is mounted, means for supporting said bar at its other end for movement about vertical and horizontal axes, means connected with said bar and engaged with the traction wheel flange to prevent shifting movement of the friction wheel on the tread face of the traction wheel axially thereof, and means for transmitting the rotative movements of said friction wheel to a speed indicating instrument.

3. Operating means for locomotive speed indicators including a friction wheel engaged with the tread face of a traction wheel, a longitudinally extending bar in one end of which said friction wheel is mounted, means for supporting said bar in its other end for movement about vertical and horizontal axes, an arm pivotally mounted at one of its ends upon one side of said bar, a peripherally grooved wheel journaled in the other end of said arm and engaged upon the flange of the traction wheel to prevent a shifting movement of the friction wheel upon the tread face of the truck wheel axially thereof, and means for transmitting the rotative movement of such friction wheel to a speed indicating instrument.

4. Operating means for locomotive speed indicators including a bar extending longitudinally with respect to a supporting frame, a friction wheel mounted in one end of said bar and engaged with the tread face of a traction wheel, a bracket fixed to said frame, a member mounted upon said bracket for turning movement about a horizontal axis, said bar being pivotally connected at its other end to said member for turning movement about a vertical axis, an arm pivoted upon one side of said bar, a peripherally grooved wheel mounted in said arm and engaged with the traction wheel flange, said bar having a lug overlying said arm to retain the wheel upon said flange and prevent shifting movement of the friction wheel upon the tread face of the traction wheel axially thereof, a spring connected with said bar to yieldingly hold the friction wheel upon said tread face, and means for transmitting the rotative movements of the friction wheel to a speed indicating instrument.

5. Operating means for locomotive speed indicators including a bar extending longitudinally with respect to a supporting frame, a friction wheel mounted in one end of said bar and engaged with the tread face of a traction wheel, a braket fixed to the frame, a member mounted upon said bracket for turning movement about a horizontal axis, said member having a housing at one end, said bar being pivotally connected at its other end to said member for turning movement about a vertical axis, an arm pivoted upon one side of said bar, a peripherally grooved wheel mounted in said arm and engaged with the traction wheel flange, said bar having a lug overlying said arm to retain the wheel upon said flange and prevent shifting movement of the friction wheel upon the tread face of the traction wheel axially thereof, a spring connected with said bar to yieldingly hold the friction wheel upon said tread face, said bar having a housing at one side of said friction wheel, and means for transmitting the rotative movements of said friction wheel to a speed indicating instrument including gearing arranged in said housings and operatively connected with each other for movement as a unit with said bar in the horizontal or vertical swinging movement thereof.

6. In operating means for locomotive speed indicators, the combination of a traction wheel, a revolution transmitting wheel frictionally engaged with the tread face of said traction wheel, and means engageable with the traction wheel for holding said transmitting wheel at substantially the same peripheral line on the tread face of said traction wheel, with means allowing movement in a vertical or horizontal direction, said last named means supporting the transmitting wheel.

7. In operating means for locomotive speed indicators, the combination of a traction wheel, a revolution transmitting wheel frictionally engaging the tread face of the traction wheel, the transmitting wheel having a face of less width than the traction wheel with which it engages, and support for holding said transmitting wheel in engagement with the tread face and permitting movement in a vertical and horizontal direction, and means for holding the transmitting wheel at substantially the same peripheral line on the tread face of the traction wheel.

8. In operating means for locomotive speed indicators, the combination of a traction wheel, a revolution transmitting wheel frictionally engaging the tread face of the traction wheel, a support for the transmitting wheel permitting movement thereof in vertical and horizontal directions, and means connected with the transmitting wheel for holding the latter at substantially the same peripheral line on the tread face of the said traction wheel.

9. In operating means for locomotive speed indicators, the combination of a traction wheel, a revolution transmitting wheel frictionally engaged with the tread face of said traction wheel, means for supporting said transmitting wheel on the tread face of said traction wheel, means engageable with the traction wheel for limiting the movement of the transmitting wheel transversely of the tread of said traction wheel, and means allowing vertical and horizontal movement of the transmitting wheel supporting means to compensate for irregularities of the tread face of said traction wheel.

10. In operating means for locomotive speed indicators, the combination of a revolution transmitting wheel operatively engaged with a traction wheel, means to support the transmitting wheel for universal movement, and means engageable with the traction wheel for retaining said transmitting wheel in position to rotate in a definite peripheral path on the tread face of the traction wheel.

11. In operating means for locomotive speed indicators having a revolution transmitting wheel, means to support said transmitting wheel for universal movement, and means engageable with the flange of a locomotive traction wheel to hold the transmitting wheel in a definite peripheral path on the tread face of the traction wheel.

12. In operating means for locomotive speed indicators, the combination of a revolution transmitting wheel frictionally engaging the tread of one of the locomotive traction wheels, a support for the transmitting wheel permitting vertical or horizontal movement of said wheel as the traction wheel simultaneously moves, and rotary means engaging the transmitting wheel and operative to prevent said transmitting wheel from shifting laterally on the tread face of the traction wheel.

In testimony that I claim the foregoing as my invention, I have signed my name hereto.

VIRGINIUS Z. CARACRISTI